United States Patent [19]

Kapuscinski et al.

[11] Patent Number: 4,640,788

[45] Date of Patent: Feb. 3, 1987

[54] HYDROCARBON COMPOSITIONS CONTAINING POLYOLEFIN GRAFT POLYMERS

[75] Inventors: Maria M. Kapuscinski, Carmel; Christopher S. Liu, Poughkeepsie; William P. Hart, Beacon; Larry D. Grina, Wappingers Falls, all of N.Y.

[73] Assignee: Texaco Inc., White Plains, N.Y.

[21] Appl. No.: 728,635

[22] Filed: Apr. 29, 1985

[51] Int. Cl.$^4$ ............... C10M 145/00; C10M 149/00
[52] U.S. Cl. ............... 252/51.5 R; 252/54.6; 252/51.5 A; 525/74; 525/75
[58] Field of Search ............ 252/51.5 R, 51.5 A, 252/54.6; 525/75, 74

[56] References Cited

U.S. PATENT DOCUMENTS

| | | | |
|---|---|---|---|
| 3,872,019 | 3/1975 | Culbertson et al. | 252/51.5 R |
| 4,098,710 | 7/1978 | Elliot et al. | 252/51.5 A |
| 4,146,489 | 3/1979 | Stambaugh et al. | 252/51.5 R |
| 4,169,063 | 9/1979 | Kiovsky | 252/51.5 A |
| 4,181,618 | 1/1980 | Durand et al. | 252/51.5 A |
| 4,219,432 | 8/1980 | Girgenti et al. | 252/51.5 A |
| 4,281,081 | 7/1981 | Jost et al. | 252/51.5 R |
| 4,382,007 | 5/1983 | Chafetz et al. | 252/51.5 A |
| 4,397,987 | 8/1983 | Cornell | 525/75 |
| 4,505,834 | 3/1985 | Papay et al. | 252/51.5 A |

*Primary Examiner*—William R. Dixon, Jr.
*Assistant Examiner*—Ellen M. McAvoy
*Attorney, Agent, or Firm*—Robert A. Kulason; James J. O'Loughlin; Carl G. Seutter

[57] ABSTRACT

Lubricants of improved properties contain ethylene-propylene copolymers bearing graft units derived from, as a functional monomer, the reaction product of (i) an unsaturated aldehyde or ketone and (ii) a primary or secondary amine which contains at least one nitrogen atom in a heterocyclic ring.

45 Claims, No Drawings

HYDROCARBON COMPOSITIONS CONTAINING POLYOLEFIN GRAFT POLYMERS

FIELD OF THE INVENTION

This invention relates to hydrocarbons including hydrocarbon lubricating oils. More particularly, it relates to hydrocarbons which contain graft polymers which permit attainment of improved properties.

BACKGROUND OF THE INVENTION

As is well known to those skilled in the art, hydrocarbon fuels and lubricating oils must be formulated, as by addition of various additives, to improve their properties.

In the case of lubricating oils, typified by those employed in railway, automotive, aircraft, marine, etc. service, it is found that they become degraded during use due inter alia to formation of sludge which may be generated by deterioration of the oil or by introduction of undesirable components from other sources including the fuel or the combustion air. In order to maintain and improve the properties of the lubricating oil, various additives have heretofore been provided; and these have been intended to improve the viscosity index, dispersancy, oxidative stability, etc. It is an object of this invention to provide an additive system which permits attainment of improved hydrocarbons. Other objects will be apparent to those skilled in the art.

STATEMENT OF THE INVENTION

In accordance with certain of its aspects, this invention is directed to a graft polymer comprising an oil-soluble, substantially linear, carbon-carbon backbone polymer having graft polymerized thereon functional units derived from the reaction product of (i) an ethylenically unsaturated aldehyde or ketone and (ii) a primary or secondary amine which contains at least one nitrogen atom in a heterocyclic ring.

DESCRIPTION OF THE INVENTION

The charge polymer which may be employed in practice of the process of this invention may include an oil-soluble, substantially linear, carbon-carbon backbone polymer. Typical carbon-carbon backbone polymers prepared from monomers bearing an ethylenically unsaturated polymerizable double bond which may be employed include homopolymers or copolymers prepared from monomer

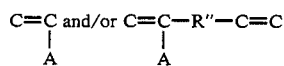

wherein A may be: hydrogen; hydrocarbon such as alkyl, aryl, etc.; acyloxy (typified by —COOR); halide; etc. R" may be divalent hydrocarbon typified by alkylene, alkarylene, aralkylene, cycloalkylene, arylene, etc. Illustrative of such monomers may be acrylates, methacrylates, vinyl halides (such as vinyl chloride), styrene, olefins such as ethylene, propylene, butylene, dienes such as butadiene, isoprene, hexadiene, ethylidene norbornene; etc. Although homopolymers of olefins (such as polyethylene, polypropylene, polyisobutylene, etc.) or copolymers of ethylene with e.g. butylene and higher olefins may be employed, the preferred carbon-carbon backbone polymers include those selected from the group consisting of ethylene-propylene copolymers (EPM or EPR) and ethylene-propylene-diene third monomer terpolymers (EPDM or EPT).

When the charge polymer is an ethylene-propylene copolymer (EPM also called EPR polymers), it may be formed by copolymerization of ethyhlene and propylene under known conditions, preferably Ziegler-Natta reaction conditions. The preferred EPM copolymers contain units derived from the ethylene in amount of 40-70 mole %, preferably 50-60 mole %, say 55 mole %, the remainder being derived from propylene.

The molecular weight $\overline{M}_n$ of the EPM copolymers which may be employed may be 10,000-1,000,000, preferably 20,000-200,000, say 100,000. The molecular weight distribution may be characterized by $\overline{M}_w/\overline{M}_n$ of less than about 15, preferably 1.5-10, say 2.

Illustrative EPM copolymers which may be employed in practice of the process of this invention may be those set forth in the following table, the first listed being preferred:

A. The Epsyn brand of EPM marketed by Copolymer Rubber and Chemical Corp., containing 60 mole % of units derived from ethylene and 40 mole % of units derived from propylene and having a $\overline{M}_n$ of 140,000 and a polydispersity index $\overline{M}_w/\overline{M}_n$ of 1.6;

B. The Epcar 505 brand of EPM marketed by B. F. Goodrich Co., containing 50 mole % of units derived from ethylene and 50 mole % of units derived from propylene and having a $\overline{M}_n$ of 25,000 and a polydispersity index of 2.5.

C. The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5;

When the charge polymer is a terpolymer of ethylene-propylene-third monomer (EPT or EPDM), it may be formed by copolymerization of ethylene, propylene and third monomer. The third monomer is commonly a non-conjugated diene typified by dicyclopentadiene; 1,4-hexadiene; or ethylidene norbornene. Polymerization is effected under known conditions generally comparable to those employed in preparing the EPM products. The preferred terpolymers contain units derived from ethylene in amount of 40-70 mole %, preferably 50-65 mole %, say 60 mole % and units derived from the propylene in amount of 20-60 mole %, preferably 30-50 mole %, said 38 mole % and units derived from diene third monomer in amount of 0.5-15 mole %, preferably 1-10 mole %, say 2 mole %. The molecular weight $\overline{M}_n$ of the terpolymers may typically be 10,000-1,000,000, preferably 20,000-200,000, say 80,000. Molecular weight distribution of the useful polymers is preferably narrow viz a $\overline{M}_w/\overline{M}_n$ of typically less than 15, preferably 1.5-10, say 2.

Illustrative EPT terpolymers which may be employed in practice of the process of this invention may be those set forth in the following table, the first listed being preferred.

TABLE

A. The Epsyn 4006 brand of EPT marketed by Copolymer Rubber and Chemical Corp., containing 58 mole % of units derived from ethylene, 40 mole % of units derived from propylene, and 2 mole % of units derived from ethylidene norbornene and having a $\overline{M}_n$ of 120,000 and a polydispersity index $\overline{M}_w/\overline{M}_n$ of 2.2.

B. The Ortholeum 5655 brand of EPT marketed by DuPont containing 62 mole % of units derived from ethylene, 36 mole % of units derived from propylene, and 2 mole % of units derived from 1,4-hexadiene and having a $\overline{M}_n$ of 80,000 and a polydispersity index $\overline{M}_w/\overline{M}_n$ of 2.

C. The Ortholeum 2052 brand of EPT marketed by DuPont containing 62 mole % of units derived from ethylene, 36 mole % of units derived from propylene, and 2 mole % of units derived from 1,4-hexadiene and having a $\overline{M}_n$ of 35,000 and a polydispersity index $\overline{M}_w/\overline{M}_n$ of 2.

D. The Royalene brand of EPT marketed by Uniroyal containing 60 mole % of units derived from ethylene, 37 mole % of units derived from propylene, and 3 mole % of units derived from dicyclopentadiene and having a $\overline{M}_n$ of 100,000 and a polydispersity index $\overline{M}_w/\overline{M}_n$ of 2.5.

E. The Epsyn 40A brand of EPT marketed by Copolymer Rubber and Chemical Corp., containing 60 mole % of units derived from ethylene, 37 mole % of units derived from propylene, and 3 mole % of units derived from ethylidene norbornene and having a $\overline{M}_n$ of 140,000 and a polydispersity index $\overline{M}_w/\overline{M}_n$ of 2.

The EPM and EPT polymers may contain minor portions (typically less than about 30%) of other units derived from other copolymerizable monomers.

It is a feature of the process of this invention that there may be grafted onto these oil-soluble, substantially linear carbon-carbon, backbone polymers, graft units derived functional units derived from the reaction produce of (i) an ethylenically unsaturated aldehyde or ketone and (ii) a primary or secondary amine which contains at least one nitrogen atom in a heterocyclic ring.

The carbonyl compounds (aldehydes or ketones) which may be used in practice of the process of this invention may be characterized by the formula:

In the above formula, R may be hydrogen or a hydrocarbon selected from the group consisting of alkyl, aralkyl, cycloalkyl aryl, alkaryl, and alkenyl including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is aralkyl, it may typically be benzyl, beta-phenylethyl, etc. When R is cycloalkyl it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. When R is alkenyl, it may typically be vinyl, allyl, 1-butenyl, etc. R may be inertly substituted i.e. it may bear a non-reactive substituent such as alkyl, aryl, cycloalkyl, etc. Typically inertly substituted R groups may include 3-chloropropyl, 2-ethoxyethyl, carboethoxymethyl, 4-methyl cyclohexyl, etc. The preferred R groups may be lower alkenyl, i.e. $C_2$–$C_{10}$ alkenyl, groups including e.g. ethenyl, n-propenyl, butenyl, etc. R may preferably be butenyl.

R' may be selected from the same group as is R. R and R' may be cyclized as in cyclohexenone. At least one of R and R' is an ethylenically unsaturated hydrocarbon.

The ethylenically unsaturated carbonyl compound may be a ketone or more preferably an aldehyde. When the compound is an ethylenically unsaturated ketone, it may have the formula R—CO—R'. Typical ketones may be as set forth in the following table:

TABLE benzalacetophenone
buten-1-one-3
hexen-1-one-3
3-penten-2-one
1-hexen-3-one
5-hexen-2-one When the carbonyl compound is an ethylenically unsaturated aldehyde as in the preferred embodiment, it may have the formula RCHO. Typical unsaturated aldehydes may be as set forth in the following table:

TABLE crotonaldehyde
cinnamaldehyde
acrolein
methacrolein

The amine (which may be reacted with the ethylenically unsaturated aldehyde or ketone) may be a primary or secondary amine which contains at least one nitrogen atom in a heterocyclic ring. Typical compounds include those bearing: pendant primary amine groups, typified by N-(3-aminopropyl)morpholine; pendant secondary amine groups, typified by N-(3-propylaminopropyl)-morpholine; in-ring secondary amine groups, typified by piperazine; etc.

It may commonly be characterized by the formula R*R** NH wherein R* and R** may be selected from the same group as that from which R may be selected. At least one of R* and R** is other than hydrogen; and at least one of R* and R** contains a nitrogen atom in a heterocyclic ring. R* and R** may be joined together in a cyclic configuration.

When the amine is a primary amine, it may typically be one of the following:

TABLE

N-(3-aminopropyl)morpholine
N-(3-aminopropyl)-2-pipecoline
N-(3-aminopropyl)pyrrolidone
2-aminobenzothiazole
2-aminopyrimidine
2-amino-3-picoline
4-amino-2,6-dimethyl pyrimidine When the amine is a secondary amine, it may typically be one of the following:

TABLE

N-methylpiperazine
morpholine
pyrrolidine
2,6-dimethylmorpholine
N-(betahydroxyethyl)piperazine
phenothiazine Thus in the preferred embodiment, the functional monomer may be prepared by the reaction of an unsaturated aldehyde such as crotonaldehyde and a secondary amine which is free of unsaturation, such as pyrrolidine.

It is a feature of the process of this invention in one of its aspects that the functional monomer composition may be prepared by adding to a reaction mixture (i) a carbonyl compound, preferably an unsaturated aldehyde containing an ethylenically unsaturated carbon-carbon double bond, (ii) a primary or secondary amine, preferably a heterocyclic amine containing at least one nitrogen atom in the heterocyclic ring, and (iii) a basic catalyst or a dehydrating agent.

The basic catalysts which may be employed in practice of this invention typically include those set forth in the following table:

TABLE potassium carbonate
sodium carbonate
sodium hydroxide
potassium hydroxide
tributylamine In one aspect of the invention, the functional monomer composition may be prepared by adding to a reaction mixture (i) substantially equimolar portions of carbonyl compound and amine, (ii) optional solvent, which may typically be tetrahydrofuran, dimethylacetamide, dioxane, or octanol, and (iii) catalyst in amount of typically 5–100 w% say 20 w% of the total of the reactants. The reaction mixture is maintained at 0° C.–25° C. for 1–3 hours and the catalyst is separated by filtration. The product may be purified by distillation under vacuum or it may be used without further purification.

According to another aspect of this invention, a dehydrating agent, typically a molecular sieve, may be employed. Typical of the dehydrating agents which may be employed may be those set forth in the following table:

TABLE molecular sieve
silica gel
magnesium sulfate
sodium sulfate
calcium chloride In this aspect of the invention, the desired product may be prepared by adding to a reaction mixture (i) substantially equimolar portion of carbonyl compound and amine, (ii) optional solvent which may be tetrahydrofuran, dimethylacetamide, dioxane, or octanol, and (iii) dehydrating agent such as molecular sieve in amount of typically 10–100 w%, say 30 w% of the total of the reactants. The reaction mixture is maintained at 60° C.–200° C., say 100° C. for 1–3 hours with agitation preferably under inert atmosphere such as nitrogen. Work-up may be as for the technique using basic catalyst.

It is a feature of the process of this invention that the functional monomer composition may be graft polymerized onto a base polymer typified by a copolymer of ethylene-propylene (EPR or EPM) or a terpolymer of ethylene-propylene-diene third monomer (EPT or EPDM).

In practice of this aspect of the process of this invention, 100 parts of charge EPM or EPT may be added to 100–1000 parts, say 300 parts of solvent. Typical solvent may be a hydrocarbon solvent such as n-hexane, n-heptane, tetrahydrofuran, or mineral oil. Preferred solvent may be a commercial hexane containing principally n-hexane isomers. Reaction mixture may then be heated to reaction conditions of 60° C.–180° C., preferably 150° C.–170° C., say 155° C. at 15–300 psig, preferably 180–220 psig, say 200 psig.

The functional monomer, which is to serve as graft monomer, is admitted in amount of 1–40 parts, say 10 parts, followed by a solution in hydrocarbon of free radical initiator. Typical free radical initiators may include dicumyl peroxide, di-t-butyl peroxide, benzoyl peroxide, di-isopropyl peroxide, azobisisobutyronitrile, etc. The solvent is preferably the same as that in which the EPM or EPT is dissolved. The initiator may be added in amount of 0.2–10 parts, say 4 parts in 0.8–40 parts, say 16 parts of solvent.

The free-radical initiator may be admixed with the graft solvent, monomer, and the polymer at a temperature below the decomposition temperature of the initiator. Typically mixing may be carried out at below about 40° C., preferably 20° C. to 40° C., say 20° C. The reaction mixture is then raised to a temperature at least as high as the decomposition temperature of the initiator, typically 60° C. or higher.

Reaction is typically carried out at 60° C.–180° C., say 155° C. and 180–220 psig, say 200 psig during which time graft polymerization of the amine onto the base EPM or EPT polymer occurs. The final product graft polymer maybe characterized by the presence of the units derived from graft monomer on the backbone polymer.

Typically there may be one unit derived from graft monomer per 12.5–10,000, say 167 carbon atoms the charge backbone polymer. Alternatively expressed, there may be 0.1–80, say 6 graft units per 1000 carbon atoms of polymer backbone.

For ease of handling, the polymerization solvent may be exchanged with a heavier solvent such as SUS 100 oil. Product graft polymer is typically obtained as a solution of 6–12 parts, say 8.5 parts thereof in 88–94 parts, say 91.5 parts of solvent.

The product so formed may be an oil-soluble, substantially linear, carbon-carbon backbone polymer of molecular weight $\overline{M}_n$ of 10,000–1,000,000, preferably 20,000–200,000, say 80,000, having graft polymerized thereon (per 1000 carbon atoms of polymer backgone) 0.1–80 units, preferably 1–15 units, say 6 units derived from graft monomer.

Lubricating oils in which the dispersant viscosity index improvers of this invention may find use may include automotive, aircraft, marine, railway, etc., oils; oils used in spark ignition or compression ignition engines; summer or winter oils; etc. Typically the lubricating oils may be characterized by an ibp of 570° F.–660° F., say 610° F.; an ep of 750° F.–1200° F., say 1020° F.; and an API gravity of 25–31, say 29.

A typical lubricating oil in which the polymer of this invention may be present may be a standard SAE 5W-30 hydrocarbon motor oil formulation having the following composition:

TABLE

|  | w % |
|---|---|
| Base Oil | 82 |
| Viscosity Index Improver | 9 |
| (10 w % ethylene-propylene copolymer in 90% | |

| | W % |
|---|---|
| inert oil) | |
| Standard Additive Package | 9 |
| Polyisobutenyl ($\overline{M}_n$ 1290) succinimide (dispersant); | |
| calcium sulfonate (detergent); | |
| Zinc dithiophosphate (anti-wear); | |
| di-nonyl diphenyl amine (anti-oxidant); | |
| 4,4'-methylene-bis (2,6-di-t-butyl phenol) (antioxidant); | |

Use of the additive of this invention makes it possible to readily increase the viscosity index by 25–40 units, say 35 units and to obtain improved ratings on the tests measuring the dispersancy of the system. The viscosity index is determined by ASTM Test D-445.

Dispersancy is determined by the Bench VC Test (BVCT). In this test, the turbidity of an oil containing an additive is measured after heating the test oil to which has been added a standard blow-by. The result which correlates with dispersancy is compared to three reference standards (Excellent, Good and Fair), tested simultaneously with the test sample. The numerical rating decreases with an increase in dispersant effectiveness. Results similar to or lower than that of the Good Reference indicate that the additive is a good candidate.

It is possible to obtain product polymers which serve as multi-functional additives which permit attainment of a dispersant, anti-oxidant, viscosity index improver when added to a hydrocarbon lubricating oil or to a synthetic type lubricating oil.

It is a feature of this invention that the so-prepared graft polymers may find use in lubricating oils as dispersant, anti-oxidant, viscosity index improvers when present in effective amount of 0.2–5 w%, preferably 0.4–3 w%, say 0.9 w%.

Practice of the process of this invention will be apparent to those skilled in the art from the following examples wherein, as elsewhere in this specification, all parts are parts by weight unless otherwise set forth. Control examples are designated by an asterisk.

DESCRIPTION OF PREFERRED EMBODIMENTS

Example I

In this example which represents the best mode presently known, there is added to a reaction mixture, equimolar portions of crotonaldehyde (70 parts) and pyrrolidine (71 parts). There is also added, as dehydrating agent, 70 parts of Aldridge brand Grade 12, molecular sieve. The reaction mixture, under an inert nitrogen atmosphere, is heated with agitation to about 100° C. for 2 hours. The mixture is then cooled to room temperature and filtered to remove catalyst. The product functional monomer is used as so prepared without further purification.

Example II

To a mixture of equimolar portions of N-methyl piperazine (100 parts) and potassium carbonate (34 parts), maintained at minus 5° C., there is added dropwise an equimolar portion (70 parts) of crotonaldehyde. The mixture is stirred at 0° C. for one hour and then at 25° C. for 3 hours. The solid is removed by filtration; and the unreacted starting materials are removed by vacuum distillation. The product functional monomer so prepared is used without further purification.

Example III

In this example, the procedure of Example I is followed except that the amine is N-(3-aminopropyl)morpholine (144 parts) (1 mole).

Example IV

In this example, the procedure of Example I is followed except that the amine is 1-(3-amino-propyl)-2-pipecoline (156 parts) (1 mole).

Example V

In this example, the functional monomer product of Example I—the reaction product of crotonaldehyde and pyrrolidine—is grafted onto an ethylene-propylene copolymer (EPM) $\overline{M}_n$ of 120,000, containing 60 mole % derived from ethylene and 40 mole % derived from propylene.

100 parts of ethylene-propylene copolymer, dissolved in 400 parts of SUN-148 mineral oil as grafting solvent is heated to 155° C. with stirring under nitrogen. 10 parts of the monomer product of Example I is added, followed by 4 parts of dicumyl peroxide dissolved in 12 parts of SUN-148 mineral oil grafting solvent. The mixture is stirred at 155° C. for one hour. Solvent Neutral Oil 100 (SNO-100) is added to give a solution containing 8.5 w% polymer; and this solution is used as an additive to lubricating oil without further treatment.

Example VI

In this example, the procedure of Example V is followed except that the copolymer employed is the Ortholeum 5655 brand of terpolymer of ethylene-propylene-1,4-hexadiene of molecular weight $\overline{M}_n$ of 75,000 and containing 64 mole % of units derived from propylene, 35 mole % of units derived from ethylene, and 1 mole % of units derived from 1,4-hexadiene.

Example VII

In this Example, the procedure of Example V is followed except that the monomer grafted is the reaction product of equimolar amounts of crotonaldehyde and N-methylpiperazine.

Example VIII

In this Example, the procedure of Example V is followed except that the backbone polymer is the same EPDM polymer used in Example VI and the monomer grafted is the product of Example II.

Example IX

In this Example, the procedure of Example V is followed except that the monomer grafted is the product of Example III, the reaction product of crotonaldehyde and N-(3-amino-propyl)morpholine.

Example X

In this Example, the procedure of Example V is followed except that the monomer grafted is the product of Example IV, the reaction product of croton aldehyde and 1-(3-amino-propyl)-2-pipecoline.

Examples XI–XVI

In this series of Examples, the additive products prepared in Examples V–X are added in amount of 10 w% (corresponding to 0.85 w% of active ingredient) to a fully formulated base blend containing the following components:

| Components | W % |
|---|---|
| SNO-130 Oil | 75.25 |
| SNO-320 Oil | 21.64 |
| Zinc dithiophosphate (anti-wear) | 1.12 |
| Naugalube 438 Brand of 4,4'-di-nonyl-di-phenyl amine (anti-oxidant) | 0.39 |
| Surchem 521 Brand of Mg Sulfonate (detergent) | 1.50 |
| Silicone polymer (anti-foamant) | 150 ppm |

This oil had the following properties:

| Property | Value |
|---|---|
| Viscosity Kin | |
| 40° C. CS | 31.50 |
| 100° C. CS | 5.36 |
| Pour Point °F. | +5 |
| Ash sulfated % (ASTM D-874) | 0.93 |
| Phosphorus % (X-ray) | 0.11 |
| Sulfur % (X-ray) total | 0.40 |
| Zinc % (X-ray) | 0.12 |
| Magnesium % | 0.33 |
| Cold Cranking Simulator (cP @ −18° C.) | 1660 |

Each of the products of Examples V–X so formulated with the fully formulated base blend is subjected to the Bench VC Test (BVCT) to determine their dispersancy. The results are as set forth in the following table:

| Example | Product | Result | Standards Excellent/Good/Poor |
|---|---|---|---|
| XI | V | 23.2 | 10.0/29.9/70.0 |
| XII | VI | 23.6 | 8.0/29.4/68.0 |
| XIII | VII | 36.2 | 7.9/29.4/60.6 |
| XIV | VIII | 16.3 | 8.0/29.4/68.0 |
| XV | IX | 46.5 | 12.6/38.0/66.5 |
| XVI | X | 35.4 | 2.9/25.4/60.6 |

From this Table, it is clear that the dispersant, viscosity index improvers of this invention have good dispersant activity. They compare favorably with the dispersant activity of current commercial dispersant viscosity index improvers.

Although this invention has been illustrated by reference to specific embodiments, it will be apparent to those skilled in the art that various changes and modifications may be made which clearly fall within the scope of this invention.

What is claimed is:

1. A graft polymer comprising an oil-soluble, substantially linear, carbon-carbon backbone polymer having graft polymerized thereon units derived from, as a functional monomer, the reaction product of (i) an unsaturated aldehyde or ketone and (ii) a primary or secondary amine which contains at least one nitrogen atom in a heterocyclic ring.

2. A graft polymer as claimed in claim 1 wherein said backbone polymer is a copolymer of ethylene-propylene or a terpolymer of ethylene-propylene-diene monomer.

3. A graft polymer as claimed in claim 1 wherein the molecular weight $\overline{M}_n$ of said backbone polymer is 10,000–1,000,000.

4. A graft polymer as claimed in claim 1 wherein the molecular weight $\overline{M}_n$ of said backbone polymer is 20,000–200,000.

5. A graft polymer as claimed in claim 1 wherein said functional monomer is prepared from crotonaldehyde.

6. A graft polymer as claimed in claim 1 wherein said functional monomer is prepared from a secondary amine.

7. A graft polymer as claimed in claim 1 wherein said functional monomer is prepared from a primary amine.

8. A graft polymer as claimed in claim 1 wherein said functional monomer is prepared from a heterocyclic amine containing a secondary amine in a heterocyclic ring.

9. A graft polymer as claimed in claim 1 wherein said functional monomer is prepared from a piperazine.

10. A graft polymer as claimed in claim 1 wherein said functional monomer is prepared from 1-(3-aminopropyl)-2-pipecoline.

11. A graft polymer as claimed in claim 1 wherein said functional monomer is prepared from a pyrrolidine.

12. A graft polymer as claimed in claim 1 wherein said functional monomer is prepared from a N-methyl piperazine.

13. A graft polymer as claimed in claim 1 wherein said functional monomer is prepared from a N-(3-aminopropyl)morpholine.

14. A graft polymer as claimed in claim 1 wherein said graft polymer contains, per 1000 carbon atoms in the backbone polymer, 0.1–80 units derived from functional monomer.

15. A graft polymer comprising an oil-soluble, substantially linear, carbon-carbon backbone polymer of molecular weight $\overline{M}_n$ of 10,000–1,000,000 selected from ethylene-propylene or from ethylene-propylene-third monomer backbone polymers, said backbone polymer having graft polymerized thereon units derived from the functional monomer formed from (i) crotonaldehyde and (ii) N-methyl piperazine or pyrrolidine or N-(3-aminopropyl)morpholine or 1-(3-aminopropyl)-2-pipecoline.

16. The process for preparing a graft polymer which comprises intimately admixing in a reaction mixture a free radical initiator and (i) an oil-soluble, substantially linear, carbon-carbon backbone polymer, and (ii), as a functional monomer, the reaction product of (i) an unsaturated aldehyde or ketone and (ii) a primary or secondary amine which contains at least one nitrogen atom in a heterocyclic ring, maintaining the temperature of the reaction mixture at a temperature at least as high as the decomposition temperature of said initiator thereby effecting decomposition of said initiator and graft polymerization of said functional monomer onto said backbone polymer to form graft polymer; and recovering said graft polymer.

17. The process for preparing a graft polymer as claimed in claim 16 wherein the molecular weight $\overline{M}_n$ of said backbone polymer is 10,000–1,000,000.

18. The process for preparing a graft polymer as claimed in claim 16 wherein the molecular weight $\overline{M}_n$ of said backbone polymer is 20,000–200,000.

19. The process for preparing a graft polymer as claimed in claim 16 wherein said functional monomer is prepared from a ketone or aldehyde containing an ethylenically unsaturated double bond.

20. The process for preparing a graft polymer as claimed in claim 16 wherein said functional monomer is prepared from cinnamaldehyde.

21. The process for preparing a graft polymer as claimed in claim 16 wherein said functional monomer is prepared from crotonaldehyde.

22. The process for preparing a graft polymer as claimed in claim 16 wherein said functional monomer is prepared from a secondary amine.

23. The process for preparing a graft polymer as claimed in claim 16 wherein said functional monomer is prepared from a heterocyclic amine containing a secondary amine in a heterocyclic ring.

24. The process for preparing a graft polymer as claimed in claim 16 wherein said functional monomer is prepared from a primary amine.

25. The process for preparing a graft polymer as claimed in claim 16 wherein said functional monomer is prepared from a piperazine.

26. The process for preparing a graft polymer as claimed in claim 16 wherein said functional monomer is prepared from 1-(3-aminopropyl)-2-pipecoline.

27. The process for preparing a graft polymer as claimed in claim 16 wherein said functional monomer is prepared from a pyrrolidine.

28. The process for preparing a graft polymer as claimed in claim 16 wherein said functional monomer is prepared from N-methyl piperazine.

29. The process for preparing a graft polymer as claimed in claim 16 wherein said functional monomer is prepared from N-(3-aminopropyl)morpholine.

30. The process for preparing a graft polymer which comprises
   initially admixing in a reaction mixture (i) an oil-soluble, substantially linear, carbon-carbon backbone polymer of molecular weight $\overline{M}_n$ of 10,000–1,000,000 selected from ethylene-propylene or from ethylene-propylene-third monomer backbone polymers, (ii) as functional monomer the reaction product of crotonaldehyde and N-methyl piperazine, pyrrolidine, N-(3-aminopropyl)morpholine or 1-(3-aminopropyl)-2-pipecoline, and (iii) a free radical initiator;
   maintaining the temperature of the reaction mixture or a temperature at least as high as the decomposition temperature of said initiator thereby effecting decomposition of said initiator and graft polymerization of said functional monomer onto said backbone polymer to form graft polymer; and
   recovering said graft polymer.

31. A lubricating oil composition containing a major portion of a lubricating oil and a minor effective viscosity index improving amount of a graft polymer comprising an oil-soluble, substantially linear, carbon-carbon backbone polymer having graft polymerized thereon units derived from, as a functional monomer, the reaction product of (i) an unsaturated aldehyde or ketone and (ii) a primary or secondary amine which contains at least one nitrogen atom in a heterocyclic ring.

32. A lubricating oil composition as claimed in claim 31 wherein said backbone polymer is a copolymer of ethylene-propylene or a terpolymer of ethylene-propylene-diene monomer.

33. A lubricating oil composition as claimed in claim 31 wherein the molecular weight $\overline{M}_n$ of said backbone polymer is 10,000–1,000,000.

34. A lubricating oil composition as claimed in claim 31 wherein the molecular weight $\overline{M}_n$ of said backbone polymer is 20,000–200,000.

35. A lubricating oil composition as claimed in claim 31 wherein said functional monomer is prepared from cinnamyl aldehyde.

36. A lubricating oil composition as claimed in claim 31 wherein said functional monomer is prepared from crotonaldehyde.

37. A lubricating oil composition as claimed in claim 31 wherein said functional monomer is prepared from a secondary amine.

38. A lubricating oil composition as claimed in claim 31 wherein said functional monomer is prepared from a heterocyclic amine containing a secondary amine in a heterocyclic ring.

39. A lubricating oil composition as claimed in claim 31 wherein said functional monomer is prepared from a primary amine.

40. A lubricating oil composition as claimed in claim 31 wherein said functional monomer is prepared from a piperazine.

41. A lubricating oil composition as claimed in claim 31 wherein said functional monomer is prepared from 1-(3-aminopropyl)-2-pipecoline.

42. A lubricating oil composition as claimed in claim 31 wherein said functional monomer is prepared from a pyrrolidine.

43. A lubricating oil composition as claimed in claim 31 wherein said functional monomer is prepared from N-methyl piperazine.

44. A lubricating oil composition as claimed in claim 31 wherein said functional monomer is prepared from N-(3-aminopropyl)morpholine.

45. A lubricating oil composition containing a major portion of a lubricating oil and a minor effective viscosity index improving portion of 0.2–5 w% of a graft polymer comprising an oil-soluble, substantially linear, carbon-carbon backbone polymer having graft polymerized thereon units derived from, as a functional monomer, the reaction product of (i) an unsaturated aldehyde or ketone and (ii) a primary or secondary amine which contains at least one nitrogen atom in a heterocyclic ring.

* * * * *